US008689124B2

(12) United States Patent
 Amacker

(10) Patent No.: US 8,689,124 B2
(45) Date of Patent: Apr. 1, 2014

(54) METHOD, MEDIUM, AND SYSTEM FOR SIMPLIFYING USER MANAGEMENT OF PRODUCTS DURING ONLINE SHOPPING

(75) Inventor: Matthew Amacker, Palo Alto, CA (US)

(73) Assignee: A9.Com, Inc., Palo Alto, CA (US)

( * ) Notice: Subject to any disclaimer, the term of this patent is extended or adjusted under 35 U.S.C. 154(b) by 1087 days.

(21) Appl. No.: 11/846,680

(22) Filed: Aug. 29, 2007

(65) Prior Publication Data

US 2009/0063299 A1 Mar. 5, 2009

(51) Int. Cl.
 *G06Q 30/00* (2012.01)

(52) U.S. Cl.
 USPC .......................................... 715/769; 705/27.1

(58) Field of Classification Search
 USPC ...................... 705/26, 27, 26.1, 27.1; 715/769
 See application file for complete search history.

(56) References Cited

U.S. PATENT DOCUMENTS

| | | | | | |
|---|---|---|---|---|---|
| 5,745,111 | A | * | 4/1998 | Cline et al. ...................... | 715/769 |
| 6,133,915 | A | * | 10/2000 | Arcuri et al. ................... | 715/779 |
| 6,249,773 | B1 | * | 6/2001 | Allard et al. .................... | 705/26 |
| 6,362,842 | B1 | * | 3/2002 | Tahara et al. .................. | 715/856 |
| 6,925,444 | B1 | * | 8/2005 | McCollom et al. ......... | 705/14.51 |
| 7,162,443 | B2 | * | 1/2007 | Shah .............................. | 705/26 |
| 7,305,355 | B2 | * | 12/2007 | Tarvydas et al. ................ | 705/26 |
| 7,373,313 | B1 | * | 5/2008 | Kahle et al. ................... | 705/26.3 |
| 7,739,604 | B1 | * | 6/2010 | Lyons et al. ................... | 715/736 |
| 2002/0049637 | A1 | * | 4/2002 | Harman et al. ................. | 705/26 |
| 2007/0143694 | A1 | * | 6/2007 | Rakowski et al. ............ | 715/760 |
| 2007/0234226 | A1 | * | 10/2007 | Szeto .............................. | 715/769 |
| 2007/0271149 | A1 | * | 11/2007 | Siegel et al. ..................... | 705/26 |
| 2007/0300190 | A1 | * | 12/2007 | Bier et al. ....................... | 715/862 |
| 2008/0077874 | A1 | * | 3/2008 | Garbow et al. ............... | 715/764 |
| 2008/0140728 | A1 | * | 6/2008 | Fraser et al. ................... | 707/200 |
| 2009/0113330 | A1 | * | 4/2009 | Garrison et al. .............. | 715/769 |

OTHER PUBLICATIONS

BlueOrganizer, Jan. 16, 2007 http://web.archive.org/web/20070116033840/www.adaptiveblue.com/help_bluemenu_page.html.*
BlueOrganizer, Jan. 16, 2007 http://web.archive.org/web/20070116033840/www.adaptiveblue.com/help_bluemen u_page.html.*

* cited by examiner

*Primary Examiner* — Matthew Zimmerman
(74) *Attorney, Agent, or Firm* — Novak Druce Connolly Bove + Quigg LLP

(57) ABSTRACT

In accordance with a method for simplifying user management of products during online shopping, an informal storage space for a merchant's web site may be displayed when web pages from the merchant's web site are displayed. The informal storage space may be separate from a shopping cart for the merchant's web site. The informal storage space may include visual identifiers for products that are currently added to the informal storage space. Users may be permitted to compare the products that are currently added to the informal storage space. Users may also be permitted to make modifications to the informal storage space. State information for the informal storage space may be updated to reflect the modifications made to the informal storage space.

36 Claims, 10 Drawing Sheets

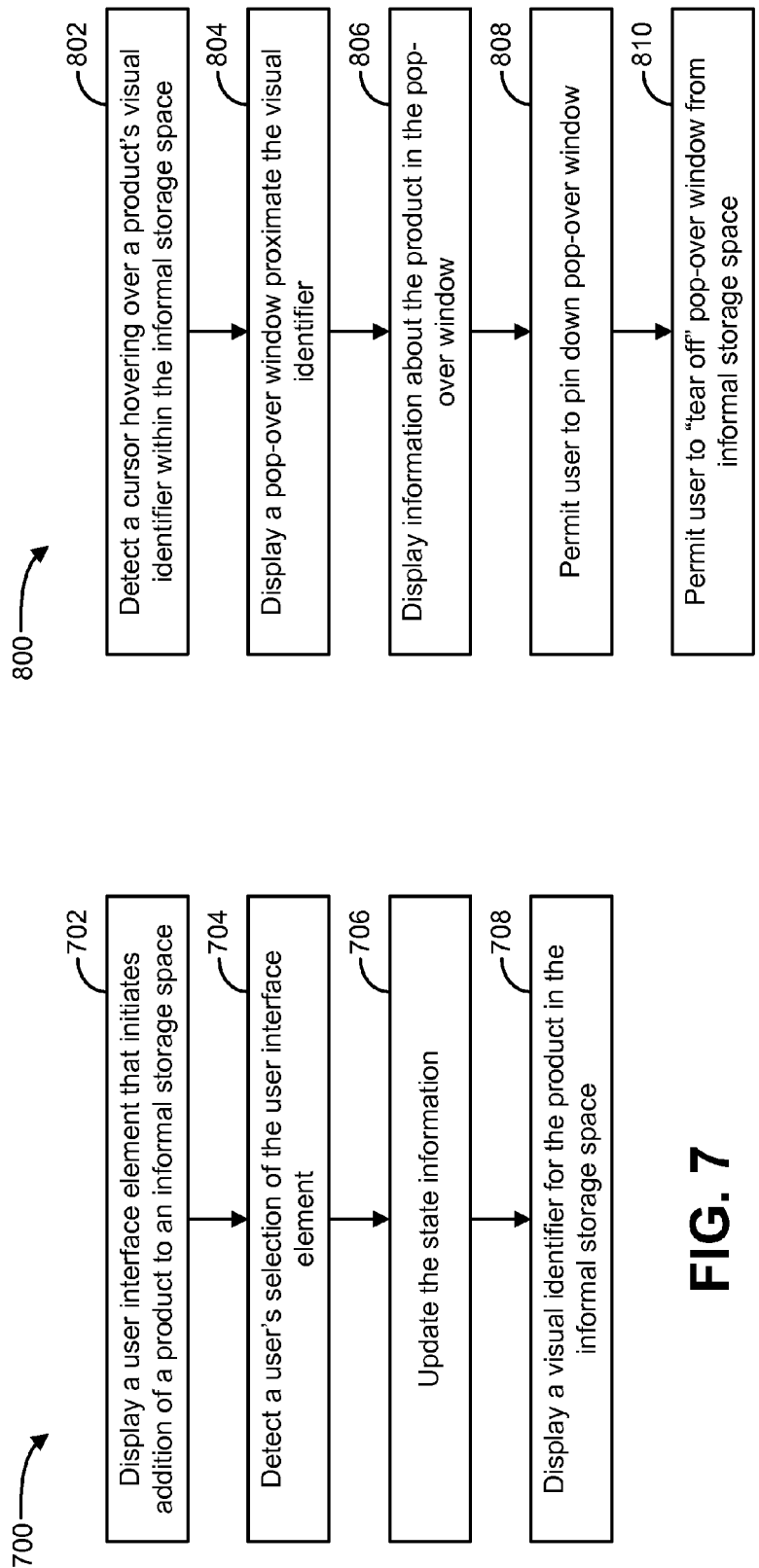

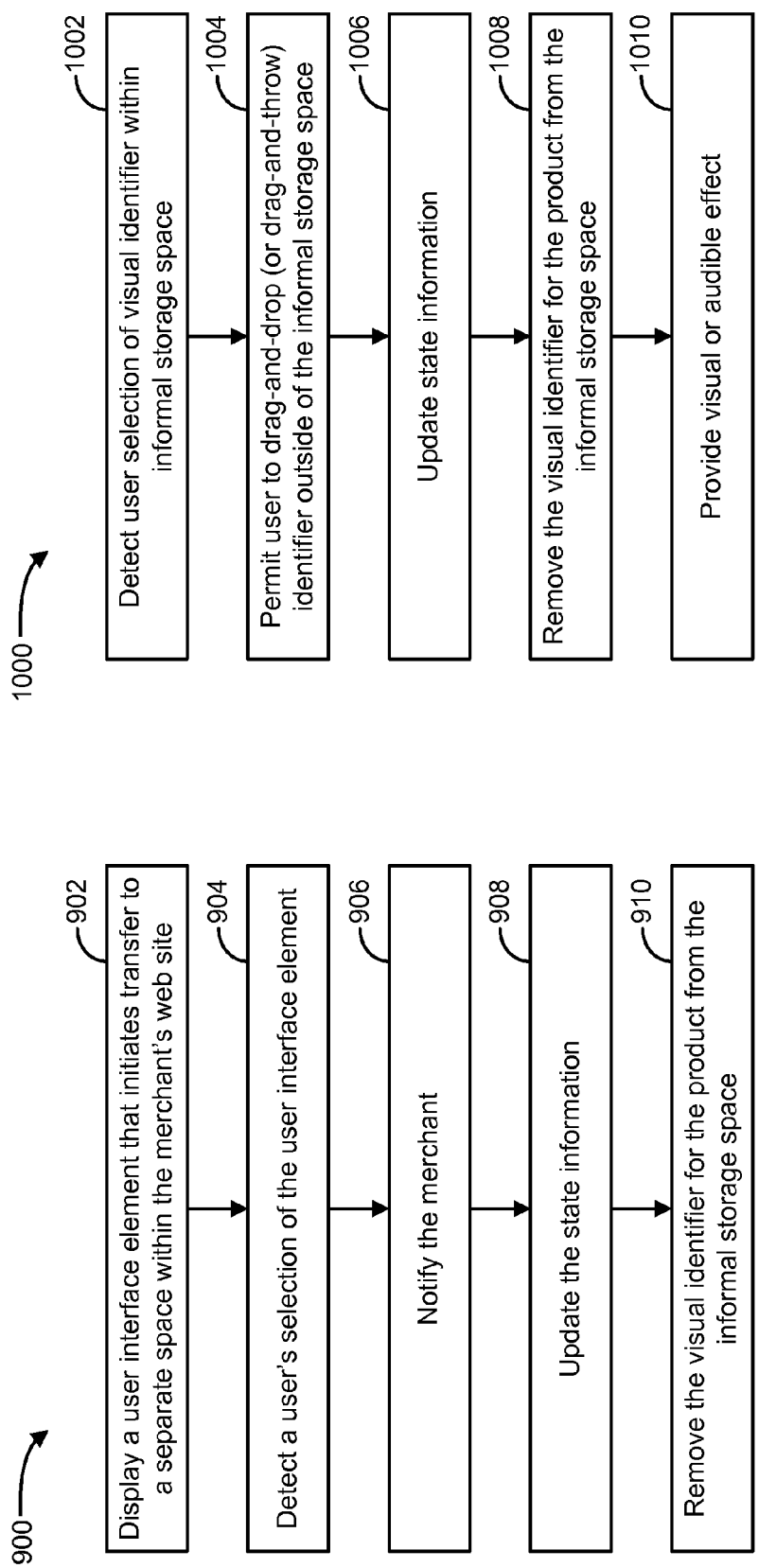

US 8,689,124 B2

METHOD, MEDIUM, AND SYSTEM FOR SIMPLIFYING USER MANAGEMENT OF PRODUCTS DURING ONLINE SHOPPING

TECHNICAL FIELD

The present disclosure relates generally to computers and computer-related technologies. More specifically, the present disclosure relates to systems and methods for simplifying user management of products during online shopping.

BACKGROUND

Many retailers have set up Internet web sites where consumers can shop for various products that are available for sale, purchase the desired products and have the products delivered to them. The term "online shopping" refers to the process of purchasing products over the Internet. The term "online merchant" may refer to a merchant that has set up an Internet web site through which products may be ordered.

Consumers may purchase a wide variety of products via online shopping. Some examples of products that may be purchased include tangible goods such as books, CDs, DVDs, tools, clothes, footwear, health/beauty items, hardware, groceries, or the like. Other examples of products that may be purchased via online shopping include "digital" goods, such as electronic books, music, movies/videos, application software, or the like.

An online merchant's web site may provide a wide variety of information about the products that are offered for sale. Such information may include images of the products, product descriptions, price, availability, customer reviews, etc.

An online merchant may offer products for sale that are manufactured by the merchant itself. Alternatively, or in addition, an online merchant may offer products for sale that are manufactured by or obtained from one or more third-party vendors.

A consumer may use a web browser on his/her computer to order products from an online merchant's web site. When products are ordered, the consumer may provide some type of payment information (e.g., a credit card number). The payment information may be encrypted as it is transferred from the consumer's computer to the merchant's server (or to a third-party payment server). Once the payment information has been received and verified, the products may be shipped to the consumer's address, downloaded to the consumer's computer, or made available for in-store pickup as appropriate.

Online shopping is popular for a variety of reasons, including its speed and ease of use. In view of the popularity of online shopping, benefits may be realized from improvements that are related to improving a consumer's online shopping experience.

BRIEF DESCRIPTION OF THE DRAWINGS

FIG. 7 illustrates another method for permitting a user to add a product to an informal storage space;

FIG. 8 illustrates a method for displaying information about a product that is currently added to an informal storage space;

FIG. 9 illustrates a method for permitting a user to transfer a product from an informal storage space to another space within a merchant's web site;

FIG. 10 illustrates a method for permitting a user to remove a product from an informal storage space.

DETAILED DESCRIPTION

Figure 1:
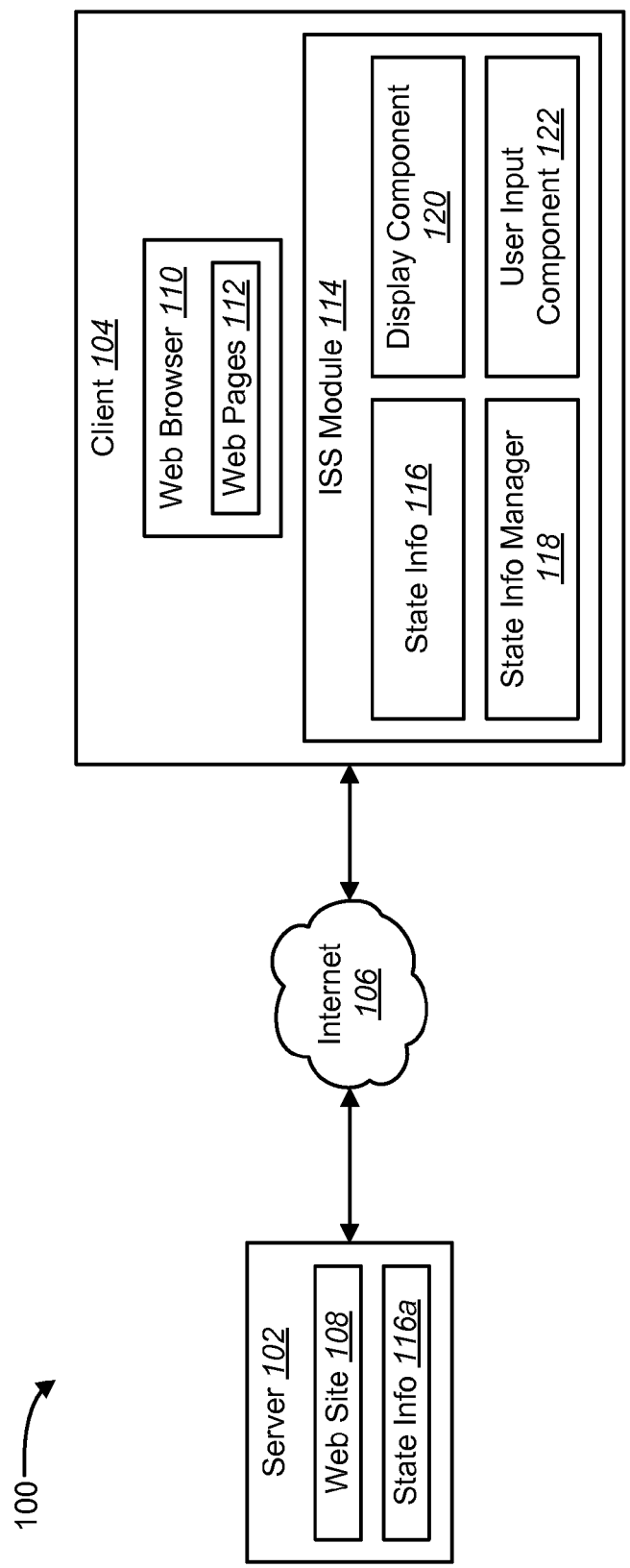
FIG. 1 illustrates a system for simplifying user management of products during online shopping through the use of an informal storage space.

A method for simplifying user management of products during online shopping is disclosed. In accordance with the method, an informal storage space for a merchant's web site may be displayed when web pages from the merchant's web site are displayed. The informal storage space may be separate from a shopping cart for the merchant's web site. The informal storage space may include visual identifiers for products that are currently added to the informal storage space. Users may be permitted to compare the products that are currently added to the informal storage space. Users may also be permitted to make modifications to the informal storage space. State information for the informal storage space may be updated to reflect the modifications made to the informal storage space.

Permitting users to make modifications to the informal storage space may comprise permitting users to add additional products to the informal storage space. A user may add a product to the informal storage space by dragging-and-dropping a visual identifier for the product to the informal storage space, or by dragging-and-throwing the visual identifier for the product to the informal storage space.

Permitting users to make modifications to the informal storage space may comprise permitting users to remove one or more of the products from the informal storage space. A user may remove a product from the informal storage space by dragging-and-dropping a visual identifier for the product outside of the informal storage space, or by dragging-and-throwing the visual identifier for the product outside of the informal storage space.

Other information, in addition to the visual identifiers, may be displayed about the products that are currently added to the informal storage space. The other information for a particular product may be displayed in a pop-over window in response to a user hovering over a visual identifier for the product in the informal storage space.

Permitting users to make modifications to the informal storage space may comprise permitting users to transfer one or more of the products from the informal storage space to a separate space within the merchant's web site.

The informal storage space may comprise a graphical representation of a product shelf. The visual identifiers for the currently added products may be positioned on the graphical representation of the product shelf. The visual identifiers may be product images.

A computer system that is configured to simplify user management of products during online shopping is also disclosed. The computer system may comprise a processor. The computer system may also comprise memory in electronic communication with the processor. The computer system may also comprise instructions stored in the memory. The instructions may be executable to display an informal storage space for a merchant's web site when web pages from the merchant's web site are displayed. The informal storage space may comprise visual identifiers for products that are currently added to the informal storage space. The instructions may also be executable to permit users to compare the products that are currently added to the informal storage space. The instructions may also be executable to permit users to make modifications to the informal storage space. The instructions may also be executable to update state information for the informal storage space to reflect the modifications made to the informal storage space.

A computer-readable medium comprising executable instructions is also disclosed. The computer-readable medium may comprise executable instructions for displaying an informal storage space for a merchant's web site when web pages from the merchant's web site are displayed. The informal storage space may comprise visual identifiers for products that are currently added to the informal storage space. The computer-readable medium may also comprise executable instructions for permitting users to compare the products that are currently added to the informal storage space. The computer-readable medium may also comprise executable instructions for permitting users to make modifications to the informal storage space. The computer-readable medium may also comprise executable instructions for updating state information for the informal storage space to reflect the modifications made to the informal storage space.

A computer system that is configured to simplify user management of products during online shopping is also disclosed. The computer system may comprise means for displaying an informal storage space for a merchant's web site when web pages from the merchant's web site are displayed. The informal storage space may comprise visual identifiers for products that are currently added to the informal storage space. The computer system may also comprise means for permitting users to compare the products that are currently added to the informal storage space. The computer system may also comprise means for permitting users to make modifications to the informal storage space. The computer system may also comprise means for updating state information for the informal storage space to reflect the modifications made to the informal storage space.

A method for simplifying user management of products during online shopping is also disclosed. In accordance with the method, an informal storage space for a merchant's web site may be displayed when web pages from the merchant's web site are displayed. The informal storage space may be separate from a shopping cart for the merchant's web site. The informal storage space may comprise images of products that are currently added to the informal storage space. Other information, in addition to the images, may be displayed about the products that are currently added to the informal storage space, thereby permitting users to compare the products that are currently added to the informal storage space. Users may be permitted to add additional products to the informal storage space. Users may be permitted to remove one or more of the products from the informal storage space. Users may be permitted to transfer one or more of the products from the informal storage space to a separate space within the merchant's web site. State information for the informal storage space may be updated to reflect modifications made to the informal storage space.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 illustrates a system 100 for simplifying user management of products during online shopping through the use of an informal storage space. A server 102 is shown in electronic communication with a client 104 via the Internet 106. The server 102 may be maintained by an Internet-based merchant, which may offer products to customers via a web site 108. The client 104 may be used by a consumer who may want to purchase goods from the merchant via the Internet 106. The consumer may use a web browser 110 on the client 104 to view web pages 112 from the merchant's web site 108.

The client 104 is shown with several components 114 that may be used to implement an informal storage space for the merchant's web site 108. The informal storage space may be thought of as a "scratch" space that may be used for temporarily storing information about products that the user is considering purchasing, but which the user has not yet decided to purchase. The informal storage space may permit users to easily compare different products while maintaining shopping context.

The informal storage space may be implemented so that it is separate from other "spaces" within the merchant's web site 108, such as a shopping cart, a wish list, etc. The informal storage space may be displayed when web pages 112 from the merchant's web site 108 are displayed, but it may be configured so that it does not otherwise interfere with the user's navigation of the merchant's web site 108. For example, a user may navigate to a web page 112 corresponding to product A, add product A to the informal storage space, and then navigate to a different web page corresponding to product B. The informal storage space may be displayed while the user is viewing the web page for product B, and the informal storage space may include a visual identifier of product A (e.g., a reduced-size image of product A) to indicate that product A has been added to the informal storage space. Additional details about various aspects of the informal storage space will be described below.

In FIG. 1, the components 114 that may be used to implement the informal storage space include state information 116 corresponding to the informal storage space, a state information manager 118, a display component 120, and a user input component 122. Collectively, these components 114 may be referred to herein as an informal storage space (ISS) module 114.

The state information 116 may include the products that are currently added to the informal storage space, as well as certain information about these products. Any suitable data structure(s) may be used to store this information such as a list, a table, an array, etc. The state information manager 118 may update the state information 116 whenever modifications are made to the informal storage space (e.g., when a product is added to or removed from the informal storage space).

State information 116a is also shown on the server 102. Storing at least some state information 116a on the server 102 may make it possible for a user to use the same informal storage space when on different clients 104. This may also make it possible for multiple users to share the same informal storage space.

In FIG. 1, state information 116 is stored on the client 104, and state information 116a is also stored on the server 102. Alternatively, state information 116 may be stored on the client 104, but not on the server 102. As another alternative, state information 116a may be stored on the server 102, but not on the client 104.

The display component 120 may be configured to display the informal storage space when web pages from the merchant's web site 108 are displayed. As mentioned above, the informal storage space may include visual identifiers (e.g., images) for products that are currently added to the informal storage space, so that the user may be able to see what products are currently added to the informal storage space. Other information about the products that are currently added to the informal storage space may also be displayed.

The user input component 122 may permit users to make modifications to the informal storage space. For example, the user input component 122 may permit users to add products to the informal storage space, remove products from the informal storage space, transfer products to different "spaces" within the merchant's web site 108 (e.g., a shopping cart, a wish list, etc.) and so forth.

The ISS module 114, and the components included therein, may be downloaded from the server 102 to the client 104. This may occur, for example, in connection with the downloading of web pages 112 for the merchant's web site 108 from the server 102 to the client 104 for display on the web browser 110. In one implementation, the ISS module 114 may be implemented as a script file that is written in a scripting language such as JavaScript.

In FIG. 1, the state information 116, state information manager 118, display component 120, and user input component 122 are illustrated as being part of the same module 114. Alternatively, these components may be distributed across multiple modules, code segments, routines, programs, etc. These components may also be distributed across multiple storage media in some implementations.

Figure 2:
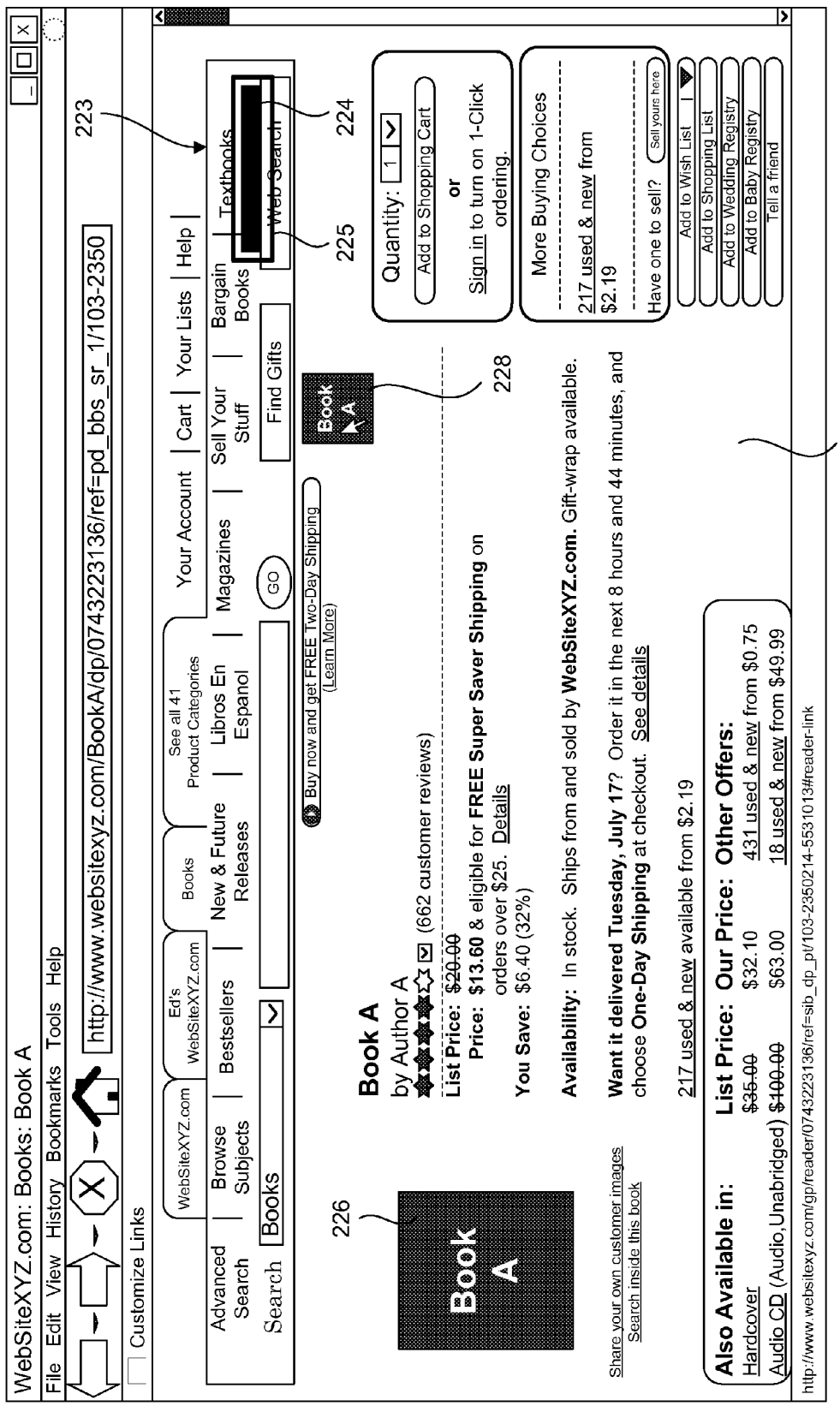
FIG. 2 illustrates an example showing how a user may be permitted to add a product to an informal storage space.

FIG. 2 illustrates an example showing how a user may be permitted to add a product to an informal storage space. A web page 212 from a merchant's web site 108 is shown as it may appear on the display device of a computer, such as the client 104 in the system 100 of FIG. 1. An informal storage space 223 is displayed on top of the web page 212. FIG. 2 shows the informal storage space 223 as including a graphical representation of a product shelf 224. The product shelf 224 is shown as being empty, thereby indicating that there are not currently any products in the informal storage space 223.

FIG. 2 shows the informal storage space 223, including the product shelf 224, as being positioned in the upper right portion of the web page 212. However, the informal storage space 223 may be positioned in other locations. The informal storage space 223 may be positioned in a location where it does not interfere with the user's viewing of and interaction with the web page 212.

The web page 212 includes information about a product that is being offered for sale by the Internet merchant. The product is a book, which is titled "Book A." FIG. 2 shows the web page 212 as including a graphical representation 226 of Book A, which may be an image 226 of Book A.

A user who is viewing the web page 212 may be considering purchasing Book A. However, the user may not be completely certain that he/she wants to purchase Book A. The user may want to look at other books before making a final decision about whether or not to purchase Book A. Therefore, the user may decide to add Book A to the informal storage space 223.

To add Book A to the informal storage space 223, the user may select the image 226 of Book A. This may be done by using a pointing device, such as a mouse. For example, the user may position a mouse cursor over the image 226 of Book A, and then click and hold down a mouse button. The user may then drag-and-drop a reduced-size version 228 of the image 226 over to the product shelf 224, thereby adding Book A to the informal storage space 223. FIG. 2 shows the reduced-size version 228 of the image 226 as it is being dragged over to the product shelf 224.

Instead of dragging the visual identifier 228 for the product all the way to the product shelf 224 and then dropping it on the product shelf 224, the user may be permitted to drag the visual identifier 228 and then "throw" it onto the product shelf 224. For example, if the user drags a visual identifier 228 for a product a certain distance from its origination (e.g., a certain number of pixels), then it may be inferred that the user intends to take the visual identifier 228 all the way to the product shelf 224. In response, the corresponding product may be added to the product shelf 224, and the visual identifier 228 for the product may be displayed on the product shelf 224, without the user having to drag the visual identifier 228 all the way to the product shelf 224. This sequence of events may appear as though the user is "throwing" the visual identifier 228 onto the product shelf 224. This feature may be advantageous when the user is viewing a long list of results. It may be awkward for the user to drag a visual identifier 228 for a product that is located near the bottom of the list all the way to the product shelf 224. In this situation, being able to drag and "throw" the visual identifier 228 onto the product shelf 224 may be simpler for the user.

The reduced-size image 228 may be obtained by reducing the image 226 of the product that is displayed on the web page 212. This function may be performed by the web browser 110 itself in response to a command from the ISS module 114. If an image 226 is not displayed on the web page 212, then the image 226 (or other type of visual identifier) may be retrieved from the merchant's server 102.

When the user selects the image 226, the informal storage space 223 may be highlighted or otherwise accentuated to make it easier for the user to locate the informal storage space 223 within the web page 212. In FIG. 2, a rectangular highlight box 225 is shown surrounding the product shelf 224. This highlight box 225 may be a bright, noticeable color such as yellow, gold, red, etc.

Figure 3:
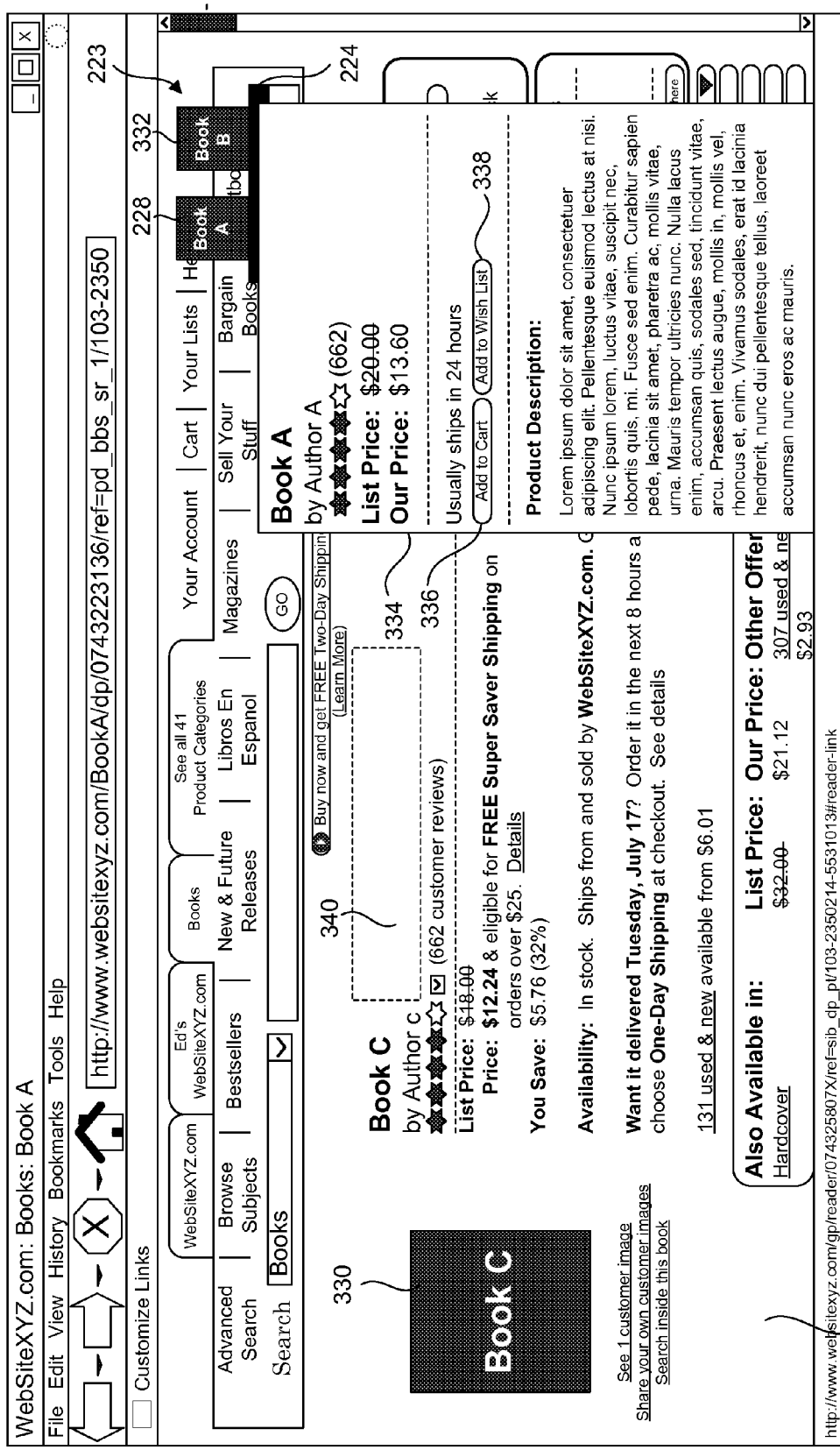
FIG. 3 illustrates an example showing how an informal storage space may be used to facilitate comparison of products during online shopping.

FIG. 3 illustrates an example showing how an informal storage space 223 may be used to facilitate comparison of products during online shopping. A different web page 312 from the merchant's web site 108 is shown. This web page 312 includes information about a different book, which is titled "Book C." FIG. 3 shows the web page 312 as including a graphical representation 330 of Book C, which may be an image 330 of Book A.

A reduced-size image 228 of Book A is displayed on top of the product shelf 224, indicating that Book A is currently added to the informal storage space 223. In addition, a reduced-size image 332 of another product, Book B, is also displayed on top of the product shelf 224. This indicates that Book B has also been added to the informal storage space 223.

As mentioned, the web page 312 includes information about Book C. The information that is provided for Book C includes the title, author, average customer review, price, etc. A pop-over window 334 is displayed on top of the web page 312, proximate the reduced-size image 228 of Book A. The pop-over window 334 includes information about Book A. The information that is provided for Book A includes the title, author, average customer review, price, etc. Thus, the information about Book A that is provided in the pop-over window 334 is similar to the information about Book C that is provided on the web page 312. Accordingly, the user may compare information about Book A and Book C without having to navigate back and forth between the web page 212 corresponding to Book A and the web page 312 corresponding to Book C.

The user may cause the pop-over window 334 to appear by hovering over the reduced-size image 228 of Book A on the product shelf 224 with a mouse cursor. The informal storage space 223 may be configured so that when the user moves his/her mouse cursor off of the reduced-size image 228 of Book A, the pop-over window 334 disappears. Functionality may be provided that would permit the user to "pin down" the pop-over window 334 so that it continues to be displayed even after the user moves his/her mouse cursor off of the reduced-size image 228 of Book A. If this functionality were provided, the pop-over window 334 corresponding to Book A may be displayed together with a similar pop-over window corresponding to Book B. This may allow the user to simultaneously view information about Book A, Book B, and Book C.

The user may be permitted to "tear off" pop-over windows from the product shelf 224 and move them around, resize them etc. For example, the user may be permitted to "tear off" the pop-over window 334 corresponding to Book A, shrink it so that it is smaller, and move it elsewhere on the web page 312. The user may then do the same thing with a pop-over window for Book B, so that information about Book A, Book B, and Book C is visible at the same time.

The pop-over window 334 includes a button 336 labeled "Add to Cart," and another button 338 labeled "Add to Wish List." By clicking on the button 336 labeled "Add to Cart," the user may add Book A to the user's shopping cart. By clicking on the button 338 labeled "Add to Wish List," the user may add Book A to a wish list.

To remove a product from the informal storage space 223, the user may simply drag the reduced-size image of the product off of the product shelf 224 and outside of the informal storage space 223. For example, to remove Book A from the informal storage space 223, the user may drag-and-drop (or drag-and-throw, as discussed above) the reduced-size image 228 of Book A to any region of the web page 312 that is outside of the informal storage space 223, such as the region 340 that is illustrated by dotted lines in FIG. 3. A visual or audible effect may be provided to confirm to the user that the product has been removed from the informal storage space 223.

Users may be permitted to remove products from the informal storage space 223 in other ways, such as by selecting an option from a suitable user interface element (e.g., a pop-over window, toolkit, etc.). A user interface element with the option to remove the product from the informal storage space 223 may be displayed in response to the user hovering over the reduced-size image 228 in the informal storage space 223 with a mouse cursor.

Functionality may be provided which permits the user to take a single action that results in something happening to all of the products that are currently added to the informal storage space 223. For example, the user may take a single action that results in all of the products from the informal storage space 223 being added to his/her shopping cart. As another example, the user may take a single action that results in all of the products being removed from the informal storage space 223. The action taken by the user may be clicking on a user interface element, selecting an option in a pop-over window or on a toolkit, etc.

The reduced-size images 228, 332 that are displayed in the informal storage space 223 may permit the user to quickly and easily access product detail pages (i.e., web pages that provide detailed information about the products). For example, by clicking on the reduced-size image 228 of Book A, the product detail page for Book A may be displayed.

FIG. 3 shows the informal storage space 223 as including two products. As additional products are added, the informal storage space 223 may expand, to a certain predetermined maximum size. For example, the size of the product shelf 224 may increase horizontally to some maximum width. When the product shelf 224 reaches its maximum size, user interface elements (e.g., scroll bars) may be provided which allow the user to navigate the various products in the informal storage space 223.

Figure 3A:
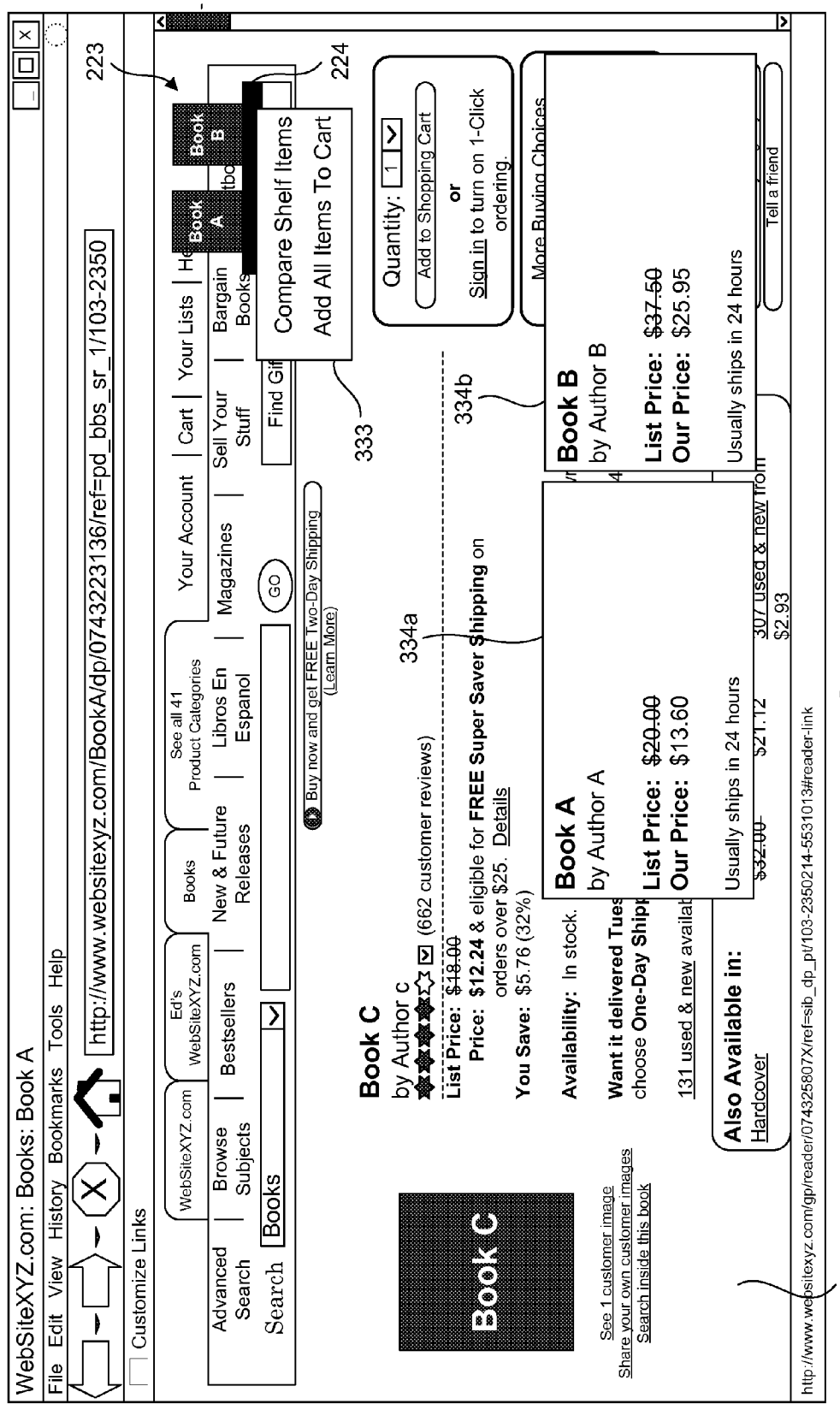
FIG. 3A illustrates an example showing how a user may be permitted to take certain actions with respect to products that are in the user's informal storage space.

FIG. 3A illustrates an example showing how a user may be permitted to take certain actions with respect to products that are in the user's informal storage space 223. FIG. 3A shows a pop-over window 333 displayed underneath the product shelf 224. This pop-over window 333 includes options corresponding to various actions that the user may take with respect to products in the user's informal storage space 224. This pop-over window 333 may be referred to as an options window 333. The options window 333 may be displayed in response to some user action, such as clicking on a button, hovering the mouse cursor over the product shelf 224, etc.

The options window 333 includes an option to "Compare Shelf Items." By selecting this option, the user may be taken to a different web page that shows a comparison of all of the products that are currently in the informal storage space 223. The options window 333 also includes an option to "Add All Items To Cart." By selecting this option, all of the products that are currently in the informal storage space 223 may be added to the user's shopping cart. Of course, additional and/or different options may be included in the options window 333.

FIG. 3A also shows a pop-over window 334a for Book A and a pop-over window 334b for Book B being displayed. As discussed above, the user may be permitted to "tear off" the pop-over windows 334 from the product shelf 224 and move them around. FIG. 3A shows the pop-over windows 334a, 334b after they have been "torn off" of the product shelf 224 and moved to the bottom of the web page 312.

Figure 4:
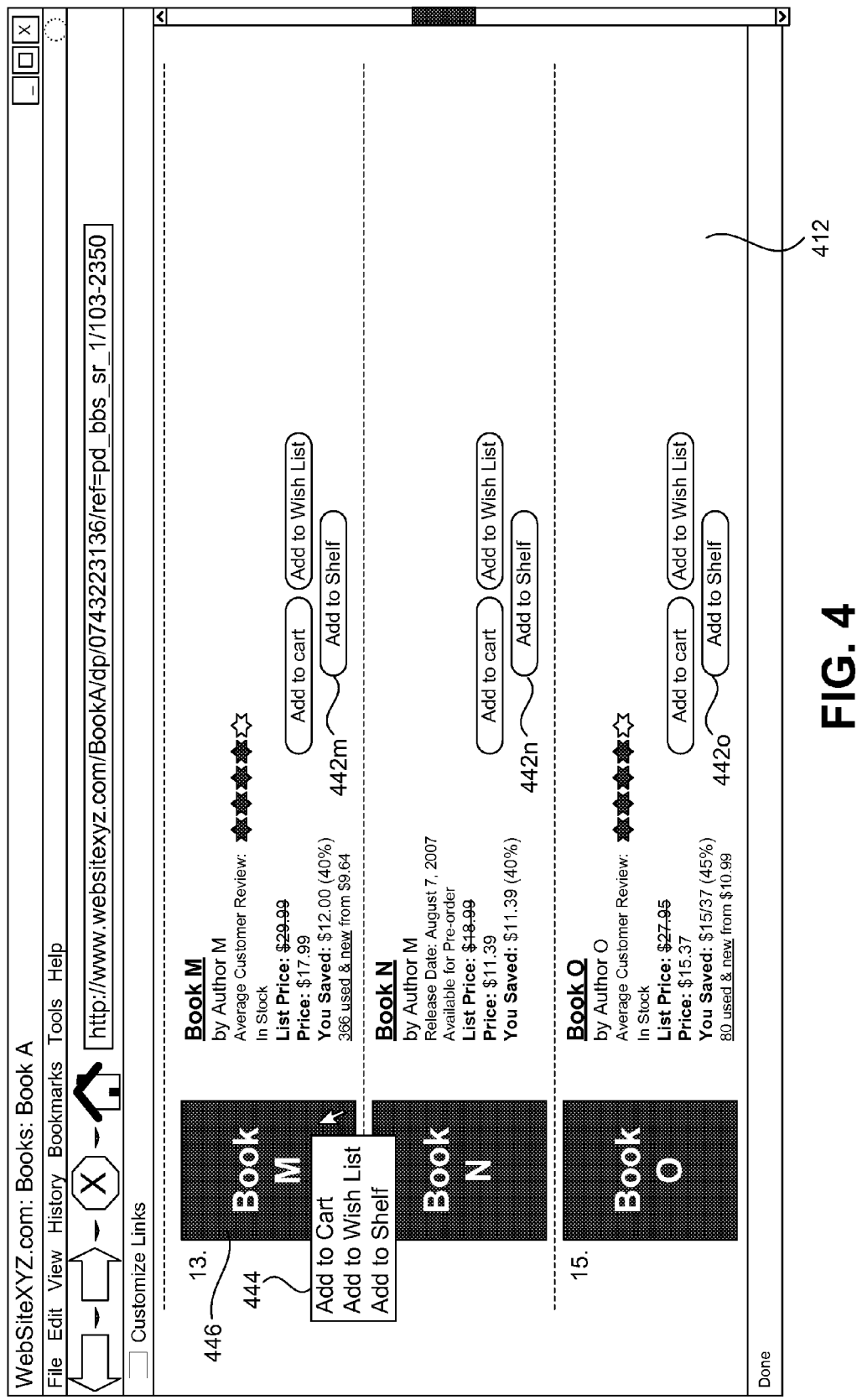
FIG. 4 illustrates another example showing how a user may be permitted to add a product to an informal storage space.

FIG. 4 illustrates another example showing how a user may be permitted to add a product to an informal storage space 223. Another web page 412 from a merchant's web site 108 is shown. This web page 412 includes a list of products (in particular, books) that may be purchased from the merchant's web site 108.

As discussed above, the user may add one of the books in the list to the informal storage space 223 by dragging-and-dropping an image of the book to the informal storage space 223. However, in this situation, the user has scrolled down partway through the list, so that the top of the web page 412 is no longer visible. As a result, the informal storage space 223 is not visible. It may be awkward for the user to try to drag-and-drop a product image to the informal storage space 223 from this point in the list.

One possible way to address this issue is to allow the user to drag-and-throw items to the informal storage space 223, as discussed above. Another alternative is illustrated in FIG. 4. For each book in the list that is shown in FIG. 4, there is a button 442 labeled "Add to Shelf." FIG. 4 shows this type of button 442m for Book M, this type of button 442n for Book N, and this type of button 442o for Book O. By clicking on the button 442 corresponding to a particular book, the user may add the book to the informal storage space 223.

When a web page 412 is displayed, it may be determined whether one or more "Add to Shelf" buttons 442 should be placed on the web page 412, and if so, what elements on the web page 412 should have the buttons 442 placed next to them. The ISS module 114 on the client 104 may make these determinations. If products that can be added to the informal storage space 223 are detected on the web page 412, then the "Add to Shelf" buttons 442 may be added to the web page 412. Alternatively, the "Add to Shelf" buttons 442 may already exist on the web page 412 when it is received by the client 104.

FIG. 4 also shows a pop-over window 444 displayed next to an image 446 of Book M. This pop-over window 444 includes an option to "Add to Shelf." By selecting this option, the user may add Book M to the informal storage space 223. The user may cause the pop-over window 444 to appear by hovering over the image 446 of Book M with a mouse cursor.

Figure 5:
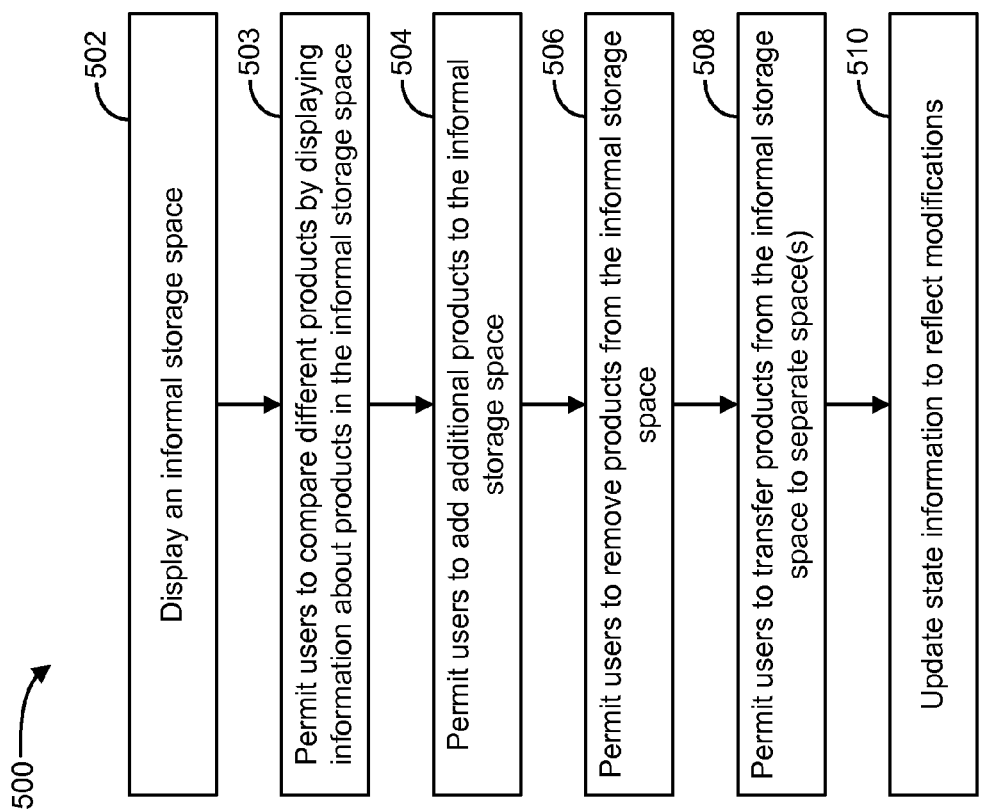
FIG. 5 illustrates a method for simplifying user management of products during online shopping through the use of an informal storage space.

FIG. 5 illustrates a method 500 for simplifying user management of products during online shopping through the use of an informal storage space 223. The method 500 may be implemented by the ISS module 114 in the system 100 of FIG. 1.

In accordance with the method 500, a informal storage space 223 may be displayed 502 when web pages 112 from an Internet merchant's web site 108 are displayed. The informal storage space 223 may include visual identifiers for products that are currently added to the informal storage space 223. In the informal storage space 223 that is shown in FIGS. 2-3, the visual identifiers are product images. However, other types of visual identifiers may be used. For example, where an image of a product is not available, a text box may be used.

In addition to visual identifiers, other information about the products that are currently added to the informal storage space 223 may be displayed 503. Displaying 503 information about the products in the informal storage space 223 may permit users to easily compare different products, as discussed above. Under some circumstances, the product information may be displayed in response to some type of user action. For example, as discussed above, product information may be displayed in a pop-over window 334 in response to the user hovering over a product's visual identifier 228 in the informal storage space 223 with a mouse cursor.

Users may be permitted to make modifications to the informal storage space 223. For example, users may be permitted 504 to add additional products to the informal storage space 223. Some examples of ways that users may add products to the informal storage space 223 were discussed above. These examples included dragging-and-dropping (or dragging-and-throwing) a visual identifier 228 for a product to the informal storage space 223, clicking on a user interface element (e.g., a button 442) corresponding to a particular product, selecting an option from a pop-over window 444 or toolkit, etc.

As another example of modifications that may be made to the informal storage space 223, users may be permitted 506 to remove products from the informal storage space 223. Some examples of ways that users may remove products from the informal storage space 223 were discussed above. These examples included dragging-and-dropping (or dragging-and-throwing) a visual identifier 228 for a product from the informal storage space 223 to a region 340 that is outside of the informal storage space 223, selecting an option from a pop-over window or toolkit, etc.

As another example of modifications that may be made to the informal storage space 223, users may be permitted 508 to transfer products from the informal storage space 223 to one or more separate spaces within the merchant's web site 108, such as a shopping cart, a wish list, etc. Some examples of ways that users may transfer products from the informal storage space 223 to separate spaces were discussed above. These examples included clicking on a user interface element (e.g., a button 336, 338), selecting an option from a pop-over window 444 or toolkit, etc.

When modifications are made to the informal storage space 223, the state information 116 for the informal storage space 223 may be updated 510 to reflect the modifications that have been made. Locally stored state information 116 may be updated 510. Additionally, any state information 116a that is stored on a merchant's server 102 may also be updated 510. This may involve sending one or more messages to the server 102. As discussed above, the state information 116 may include a list of products that are currently added to the informal storage space 223. Thus, when a product is added to the informal storage space 223, a new entry in the list may be created for the newly added product. Conversely, when a product is removed from the informal storage space 223, the corresponding entry in the list may be removed.

Figure 6:
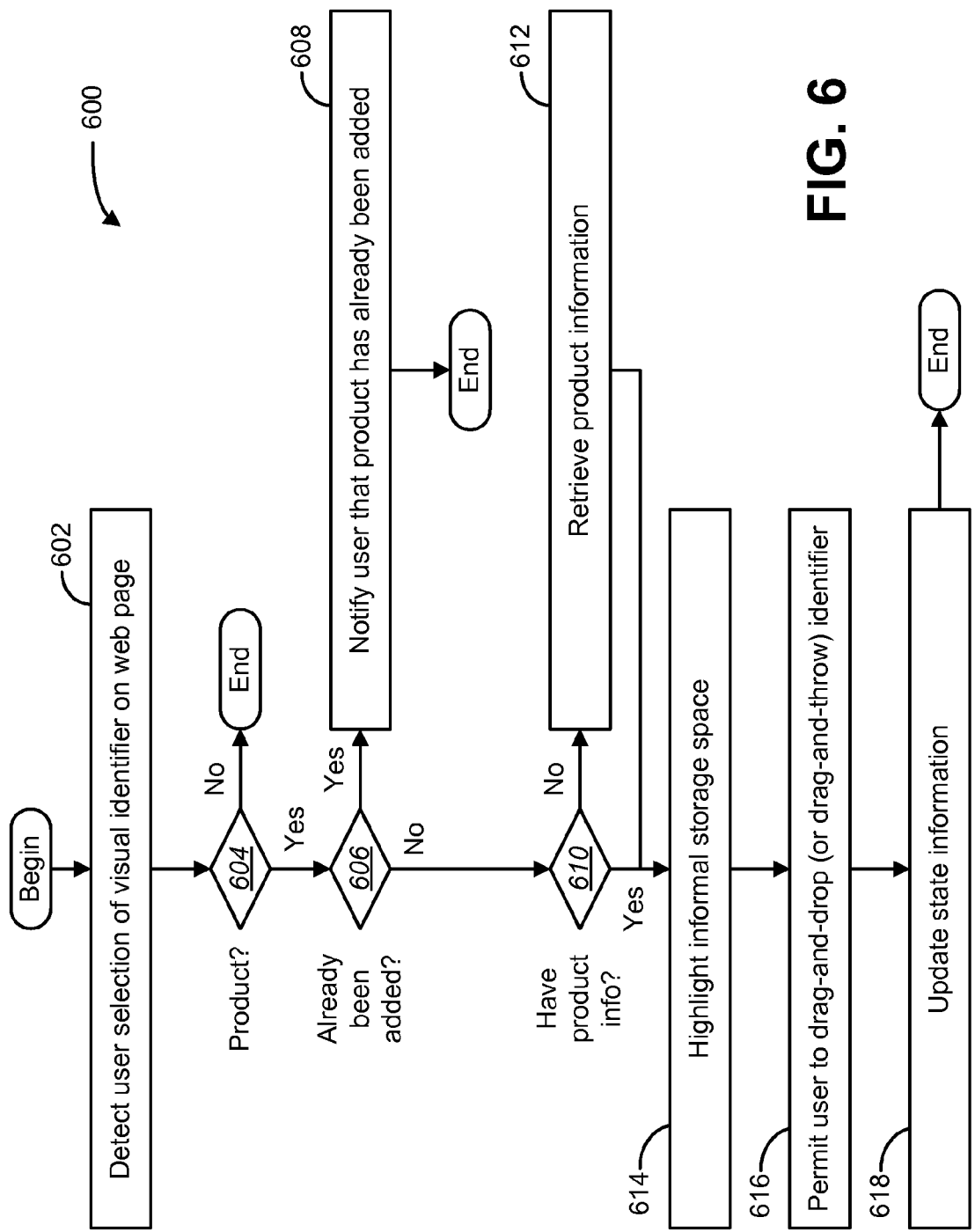
FIG. 6 illustrates a method for permitting a user to add a product to an informal storage space.

FIG. 6 illustrates a method 600 for permitting a user to add a product to an informal storage space 223. The method 600 may be performed by the ISS module 114 in the system 100 of FIG. 1.

The method 600 may be performed in response to a user selecting a visual identifier 226 (such as an image 226) on a web page 212. When a user's selection of a visual identifier 226 on a web page 212 is detected 602, a determination may be made 604 about whether the visual identifier 226 corresponds to a product that is being offered for sale by the web site 108. There are many ways that this determination may be made 604. As an example, a product identifier may be embedded or otherwise associated with a visual identifier 226 that corresponds to a product. As another example, the HTML code for the web page 212 may include a flag which indicates whether the visual identifier 226 corresponds to a product.

If it is determined 604 that the visual identifier 226 does not correspond to a product, then the method 600 may end. If, however, it is determined 604 that the visual identifier 226 corresponds to a product, then a determination may be made 606 about whether the product has already been added to the informal storage space 223. If it is determined 606 that the product has already been added to the informal storage space 223, then the user may be notified 608 that the product has already been added (e.g., by displaying an error message), and the method 600 may end.

If, however, it is determined 606 that that the product has not already been added, then a determination may be made 610 about whether information about the product has previously been retrieved from the merchant (e.g., via a server 102 that is maintained by the merchant). The product information may have been retrieved if, for example, the product had previously been added to and then subsequently removed from the informal storage space 223.

If it is determined 610 that information about the product has not previously been retrieved, then product information may be retrieved 612 from the merchant. As mentioned, the product information may be retrieved from a server 102 that is maintained by the merchant. Some Internet merchants make product information available via application programming interfaces (APIs). In this situation, the product information may be retrieved via one or more APIs. For example, the product information may be retrieved through the use of XMLHttpRequest (XHR) calls.

Under some circumstances, the product information may be retrieved 612 as soon as the user's selection of a visual identifier 226 on a web page 212 is detected 602. Alternatively, the product information may be retrieved at a later time (e.g., after the reduced-size visual identifier 228 has been dragged-and-dropped or dragged-and-thrown to the informal storage space 223).

The informal storage space 223 may be highlighted 614 or otherwise accentuated to make it easier for the user to locate the informal storage space 223 within the web page 212. This may be done as soon as the user's selection of the visual identifier 226 is detected 602. The user may then be permitted 616 to drag-and-drop (or drag-and-throw) a reduced-size visual identifier 228 (e.g., a reduced-size image 228) of the product to the informal storage space 223, thereby adding the product to the informal storage space 223.

In response, the state information 116 for the informal storage space 223 may be updated 618 to reflect the fact that the product has been added. Locally stored state information 116 may be updated 618. Additionally, any state information 116a that is stored on a merchant's server 102 may also be updated 618. This may involve sending one or more messages to the server 102. As discussed above, the state information 116 may include a list of products that are currently added to the informal storage space 223. Thus, updating 618 the state information 116 may involve creating a new entry in the list for the newly added product.

FIG. 7 illustrates another method 700 for permitting a user to add a product to an informal storage space 223. The method 700 may be performed by the ISS module 114 in the system 100 of FIG. 1.

The method 700 includes displaying 702 a user interface element that, when selected, initiates addition of a product to an informal storage space 223. Examples of these types of user interface elements include a button 442, an option in a pop-over window 444 or toolkit, etc. This type of user interface element may be continuously displayed within the contents of a web page 412 (like the buttons 442 shown in FIG. 4), or it may be displayed in response to some type of user action, such as hovering over a visual identifier 446 for a product with a mouse cursor.

At some point, a user's selection of the user interface element may be detected 704. In response, the state information 116 for the informal storage space 223 may be updated 706 to reflect the fact that the product has been added to the informal storage space 223. Locally stored state information 116 may be updated 706. Additionally, any state information 116a that is stored on a merchant's server 102 may also be updated 706. This may involve sending one or more messages to the server 102. As discussed above, the state information 116 may include a list of products that are currently added to the informal storage space 223. Thus, updating 706 the state information 116 may involve creating a new entry in the list for the newly added product. In addition to updating 706 the state information 116, a visual identifier for the product (e.g., a reduced-size image 228 of the product) may be displayed 708 within the informal storage space 223.

FIG. 8 illustrates a method 800 for displaying information about a product that is currently added to an informal storage space 223. The method 800 may be performed by the ISS module 114 in the system 100 of FIG. 1.

In accordance with the method 800, a user may at some point hover over a product's visual identifier 228 within an informal storage space 223 with a mouse cursor. When this is detected 802, a pop-over window 334 may be displayed 804 in response. This pop-over window 334 may be displayed proximate the visual identifier 228. Information about the product may be displayed 806 in the pop-over window 334. The product information that is displayed may be similar to the information that is already displayed on the web page 212 for a different product. Thus, the user may simultaneously view and compare information about different products without having to navigate back and forth between different web pages.

The user may be permitted 808 to "pin down" the pop-over window 334 so that it continues to be displayed even after the user moves his/her mouse cursor off of the visual identifier 228 of the product (so that the user can, for example, move his/her mouse cursor to a different product's visual identifier 228, in order to compare the two products). The user may also be permitted 810 to "tear off" the pop-over window 334, i.e., separate the pop-over window 334 from the informal storage space 223 so that it can be moved around, resized, etc.

FIG. 9 illustrates a method 900 for permitting a user to transfer a product from an informal storage space 223 to another space within a merchant's web site 108 (such as a shopping cart, a wish list, etc.). The method 900 may be performed by the ISS module 114 in the system 100 of FIG. 1.

The method 900 includes displaying 902 a user interface element that, when selected, initiates transfer of a product to a separate space within the merchant's web site 108. Examples of these types of user interface elements include a button 336, 338, an option in a pop-over window 444 or toolkit, etc. This type of user interface element may be continuously displayed within the contents of a web page 412, or it may be displayed in response to some type of user action, such as hovering over a product's visual identifier 228 with a mouse cursor.

At some point, a user's selection of the user interface element may be detected 904. In response, the merchant may be notified 906 that the product is being transferred to another space within the merchant's web site 108. For example, a message may be sent to a server 102 that is maintained by the merchant. The merchant may then effect the transfer of the product to the desired space within the web site 108.

The state information 116 for the informal storage space 223 may be updated 908 to reflect the fact that the product has been transferred from the informal storage space 223. Locally stored state information 116 may be updated 908. Additionally, any state information 116a that is stored on a merchant's server 102 may also be updated 908. This may involve sending one or more messages to the server 102. As discussed above, the state information 116 may include a list of products that are currently added to the informal storage space 223. Thus, updating 908 the state information 116 may involve removing an entry in the list for the product that has been transferred. In addition to updating 908 the state information 116, the visual identifier 228 (e.g., image 228) for the product may be removed 910 from the informal storage space 223.

FIG. 10 illustrates a method 1000 for permitting a user to remove a product from an informal storage space 223. The method 1000 may be performed by the ISS module 114 in the system 100 of FIG. 1.

At some point, a user's selection of a visual identifier for the product (e.g., a reduced-size product image 228) within the informal storage space 223 may be detected 1002. The user may be permitted 1004 to drag-and-drop (or drag-and-throw) the visual identifier 228 to any region of the web page 312 that is outside of the informal storage space 223, such as the region 340 that is illustrated by dotted lines in FIG. 3.

The state information 116 for the informal storage space 223 may be updated 1006 to reflect the fact that the product has been removed from the informal storage space 223. Locally stored state information 116 may be updated 1006. Additionally, any state information 116a that is stored on a merchant's server 102 may also be updated 1006. This may involve sending one or more messages to the server 102. As discussed above, the state information 116 may include a list of products that are currently added to the informal storage space 223. Thus, updating 1006 the state information 116 may involve removing an entry in the list for the product that has been transferred.

In addition to updating 1006 the state information 116, the visual identifier 228 for the product may be removed 1008 from the informal storage space 223 so that it is no longer displayed there. In addition, a visual or audible effect may be provided 1010 to confirm to the user that the product has been removed from the informal storage space 223. An example of a visual effect that may be used is an animated clip which depicts the visual identifier 228 for the product disappearing.

Figure 11:
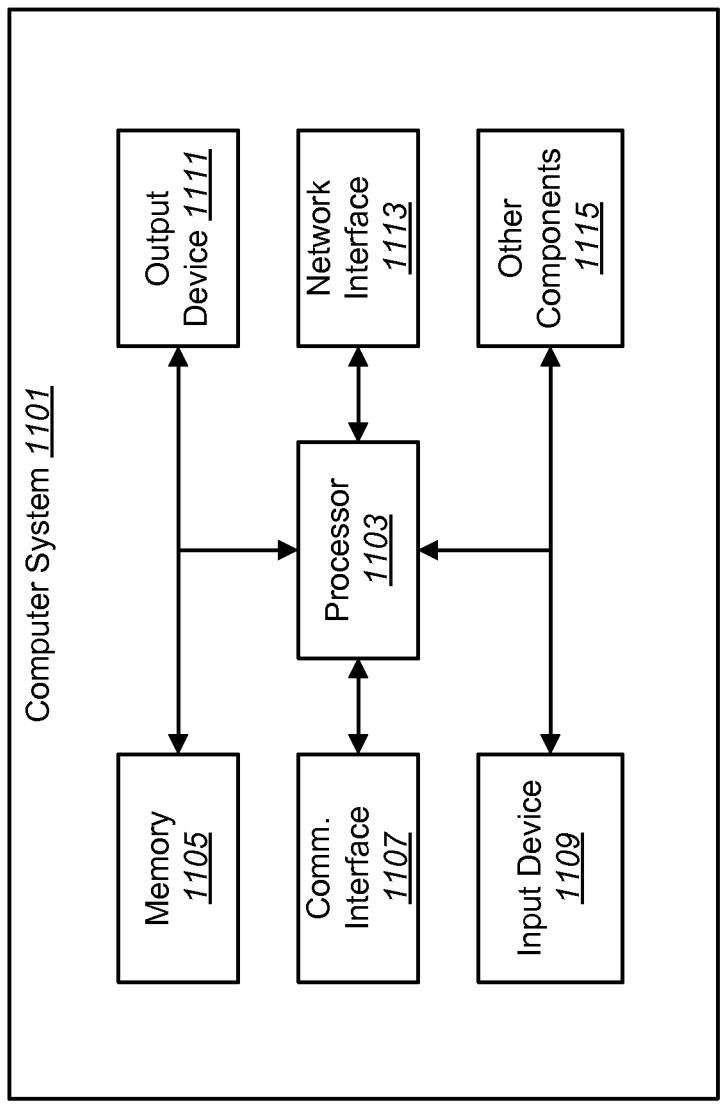
FIG. 11 illustrates various components that may be utilized in a computer system.

FIG. 11 illustrates various components that may be utilized in a computer system 1101. The server 102 and the client 104 in the system 100 of FIG. 1 may include some or all of the components shown in FIG. 11. The illustrated components may be located within the same physical structure or in separate housings or structures.

The computer system 1101 is shown with a processor 1103 and memory 1105. The processor 1103 may control the operation of the computer system 1101 and may be embodied as a microprocessor, a microcontroller, a digital signal processor (DSP) or other device known in the art. The processor 1103 typically performs logical and arithmetic operations based on program instructions stored within the memory 1105. The instructions in the memory 1105 may be executable to implement the methods described herein.

The computer system 1101 may also include one or more communication interfaces 1107 and/or network interfaces 1113 for communicating with other electronic devices. The communication interface(s) 1107 and the network interface(s) 1113 may be based on wired communication technology, wireless communication technology, or both.

The computer system 1101 may also include one or more input devices 1109 and one or more output devices 1111. The input devices 1109 and output devices 1111 may facilitate user input. Other components 1115 may also be provided as part of the computer system 1101.

FIG. 11 illustrates only one possible configuration of a computer system 1101. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A computer-implemented method for simplifying user management of items during online shopping, comprising:
   under the control of one or more computer systems configured with executable instructions,
      creating, by a computer, a display of an informal storage space for a web site at a time when at least one web page from a plurality of web pages from the web site is displayed, the informal storage space providing a location for displaying visual identifiers for items that are currently added to the informal storage space, the informal storage space being displayed within a pane of a web browser along with any of the plurality of pages from the web site;
      detecting, by the computer, movement of a first visual identifier for a first item on one of the plurality of web pages substantially toward the informal storage space for a predetermined distance from an original location of the first visual identifier original location, the predetermined distance being less than a distance between the original location of the first visual identifier and the informal storage space;
      in response to detecting the movement of the first visual identifier for the predetermined distance, adding, by the computer, the first visual identifier for the first item to the informal storage space; and
      when movement of a second visual identifier associated with a second item in the informal storage space substantially away from the informal storage space is detected, removing, by the computer, the second visual identifier for the second item from the informal storage space,
      wherein a third visual identifier displayed on a currently displayed web page is configured to be added to the informal storage space from any location on the currently displayed web page by moving the third visual identifier at least a portion of a distance towards the informal storage space independent of whether the information storage space is currently in a viewable portion of the display.

2. The method of claim 1, wherein the web site is a merchant's web site, and wherein the informal storage space is separate from a shopping cart for the merchant's web site.

3. The method of claim 1, wherein a second user input for removing at least one of the items from the informal storage space comprises at least one of dragging-and-dropping a fourth visual identifier for the at least one of the items outside of the informal storage space, and dragging-and-throwing the fourth visual identifier for the at least one of the items outside of the informal storage space.

4. The method of claim 1, further comprising displaying, by the computer, other information, in addition to the visual identifiers, about the items that are currently added to the informal storage space.

5. The method of claim 4, wherein the other information for an item is displayed in a pop-over window in response to a user hovering over a particular visual identifier for a particular item in the informal storage space.

6. The method of claim 1, further comprising transferring, by the computer, one or more of the items from the informal storage space to a separate space within the web site in response to a third user input.

7. The method of claim 1, wherein the web site is a merchant's web site, wherein the items are products from the merchant's web site, and wherein the visual identifiers are product images.

8. The method of claim 1, wherein the informal storage space comprises a graphical representation of a shelf, and wherein the visual identifiers for the currently added items are positioned on the graphical representation of the shelf.

9. A computer system that is configured to simplify user management of items during online shopping, the computer system comprising:
   a processor;
   memory in electronic communication with the processor, the memory storing instructions executable to:
      create a display of an informal storage space for a web site at a time when at least one web page from a plurality of web pages from the web site is displayed, the informal storage space providing a location for displaying visual identifiers for items that are currently added to the informal storage space, the informal storage space being displayed within a pane of a web browser along with any of the plurality of web pages from the web site;
      detect movement of a first visual identifier for a first item on one of the plurality of web pages substantially toward the informal storage space for a predetermined distance from an original location of the first visual identifier, the predetermined distance being less than a distance between the original location of the first visual identifier and the informal storage space;
      add the first visual identifier for the first item to the informal storage space in response to detecting the movement of the first visual identifier for the predetermined distance;
      detect movement of a second visual identifier associated with a second item in the informal storage space substantially away from the informal storage space; and
      remove the second visual identifier for the second item from the informal storage space,
      wherein a third visual identifier displayed on a currently displayed web page is configured to be added to the informal storage space from any location on the currently displayed web page by moving the third visual identifier at least a portion of a distance towards the informal storage space independent of whether the information storage space is currently in a viewable portion of the display.

10. The computer system of claim 9, wherein the web site is a merchant's web site, and wherein the informal storage space is separate from a shopping cart for the merchant's web site.

11. The computer system of claim 9, wherein a second user input for removing at least one of the items from the informal storage space comprises at least one of dragging-and-dropping a fourth visual identifier for the at least one of the items outside of the informal storage space, and dragging-and-throwing the fourth visual identifier for the at least one of the items outside of the informal storage space.

12. The computer system of claim 9, wherein the instructions are also executable to display other information, in addition to the visual identifiers, about the items that are currently added to the informal storage space.

13. The computer system of claim 12, wherein the other information for a particular item is displayed in a pop-over window in response to a user hovering over a particular visual identifier for a particular item in the informal storage space.

14. The computer system of claim 9, wherein the instructions are also executable to transfer one or more of the items from the informal storage space to a separate space within the web site in response to a third user input.

15. The computer system of claim 9, wherein the web site is a merchant's web site, wherein the items are products from the merchant's web site, and wherein the visual identifiers are product images.

16. The computer system of claim 9, wherein the informal storage space comprises a graphical representation of a shelf, and wherein the visual identifiers for the currently added items are positioned on the graphical representation of the shelf.

17. A non-transitory computer-readable storage medium comprising instructions that, when executed, cause a computer to:
  create a display of an informal storage space for a web site at a time when at least one web page from a plurality of web pages from the web site is displayed, the informal storage space providing a location for displaying visual identifiers for items that are currently added to the informal storage space, the informal storage space being displayed within a pane of a web browser along with any of the plurality of web pages from the web site;
  detect movement of a first visual identifier for a first item on one of the plurality of web pages substantially toward the informal storage space for a predetermined distance from an original location of the first visual identifier, the predetermined distance being less than a distance between the original location of the first visual identifier and the informal storage space;
  add the first visual identifier for the first item to the informal storage space in response to detecting the movement of the first visual identifier for the predetermined distance;
  detect movement of a second visual identifier for associated with a second item in the informal storage space substantially away from the informal storage space; and
  remove the second visual identifier for the second item from the informal storage space,
  wherein a third visual identifier displayed on a currently displayed web page is configured to be added to the informal storage space from any location on the currently displayed web page by moving the third visual identifier at least a portion of a distance towards the informal storage space independent of whether the information storage space is currently in a viewable portion of the display.

18. The non-transitory computer-readable storage medium of claim 17, wherein the web site is a merchant's web site, and wherein the informal storage space is separate from a shopping cart for the merchant's web site.

19. The non-transitory computer-readable storage medium of claim 17, wherein a second user input for removing at least one of the items from the informal storage space comprises at least one of dragging-and-dropping a fourth visual identifier for the at least one of the items outside of the informal storage space, and dragging-and-throwing the fourth visual identifier for the at least one of the items outside of the informal storage space.

20. The non-transitory computer-readable storage medium of claim 17, wherein execution of the instructions also causes the computer to display other information, in addition to the visual identifiers, about the items that are currently added to the informal storage space.

21. The non-transitory computer-readable storage medium of claim 20, wherein the other information for a particular item is displayed in a pop-over window in response to a user hovering over a particular visual identifier for a particular item in the informal storage space.

22. The non-transitory computer-readable storage medium of claim 17, wherein execution of the instructions also causes the computer to transfer one or more of the items from the informal storage space to a separate space within the web site in response to a third user input.

23. The non-transitory computer-readable storage medium of claim 17, wherein the web site is a merchant's web site, wherein the items are products from the merchant's web site, and wherein the visual identifiers are product images.

24. The non-transitory computer-readable storage medium of claim 17, wherein the informal storage space comprises a graphical representation of a shelf, and wherein the visual identifiers for the currently added items are positioned on the graphical representation of the shelf.

25. A computer system that is configured to simplify user management of items during online shopping, the computer system comprising:
  a processor;
  memory including instructions that, when executed by the processor, provide:
    means for creating a display of an informal storage space for a web site at a time when at least one web page from a plurality of web pages from the web site is displayed, the informal storage space providing a location for displaying visual identifiers for items that are currently added to the informal storage space, the informal storage space being displayed within a pane of a web browser along with any of the plurality of web pages from the web site;
    means for detecting movement of a first visual identifier for a first item on one of the plurality of web pages substantially toward the informal storage space for a predetermined distance from an original location of the first visual identifier, the predetermined distance being less than a distance between the original location of the first visual identifier and the informal storage space;
    means for adding the first visual identifier for the first item to the informal storage space in response to detecting the movement of the first visual identifier for the predetermined distance;
    means for detecting movement of a second visual identifier associated with a second item in the informal storage space substantially away from the informal storage space; and
    means for removing the second visual identifier for the second item from the informal storage space,
    wherein a third visual identifier displayed on a currently displayed web page is configured to be added to the informal storage space from any location on the currently displayed web page by moving the third visual identifier at least a portion of a distance towards the informal storage space independent of whether the information storage space is currently in a viewable portion of the display.

26. The computer system of claim 25, wherein the web site is a merchant's web site, and wherein the informal storage space is separate from a shopping cart for the merchant's web site.

27. The computer system of claim 25, further comprising means for displaying other information, in addition to the visual identifiers, about the items that are currently added to the informal storage space.

28. The computer system of claim 25, further comprising means for transferring one or more of the items from the informal storage space to a separate space within the web site in response to a third user input.

29. A computer-implemented method for simplifying user management of items during online shopping, comprising:
under the control of one or more computer systems configured with executable instructions,
creating, by a computer, a display of an informal storage space for a merchant's web site at a time when at least one web page from a plurality of web pages from the merchant's web site is displayed, the informal storage space being separate from a shopping cart for the merchant's web site, the informal storage space providing a location for displaying images of products that are currently added to the informal storage space in response to a first user input, the informal storage space being displayed within a pane of a web browser along with any of the plurality of pages from the web site, the products being added to the informal storage space by:
detecting, by the computer, movement of an image of a product on a web page from the plurality of web pages substantially toward the informal storage space for a predetermined distance from an original location of the image, the predetermined distance being less than a distance between the original location of the image and the informal storage space; and
in response to detecting the movement of the image for the predetermined distance, adding the image to the informal storage space;
displaying in at least one display element, by the computer, other information, in addition to the images, about the products that are currently added to the informal storage space;
configuring, by the computer, at least one display element including the other information about at least one of the products to be separated from the informal storage space and moved to any location on a currently displayed web page of the merchant's web site; and
transferring, by the computer, one or more of the products from the informal storage space to a separate space within the merchant's web site in response to a second user input; and
updating, by the computer, state information for the informal storage space to reflect modifications made to the informal storage space.

30. The method of claim 29, wherein the first user input comprises at least one of dragging-and-dropping an additional image of an additional product to the informal storage space, and dragging-and-throwing the additional image of the additional product to the informal storage space.

31. The method of claim 29, wherein a third user input for removing at least one of the products from the informal storage space comprises at least one of dragging-and-dropping an additional image of the at least one of the products outside of the informal storage space, and dragging-and-throwing the additional image of the at least one of the products outside of the informal storage space.

32. The method of claim 29, wherein the other information for a particular product is displayed in a pop-over window in response to a user hovering over an additional image of the particular product in the informal storage space.

33. The method of claim 29, wherein the informal storage space comprises a graphical representation of a product shelf, and wherein images of the currently added products are positioned on the graphical representation of the product shelf.

34. The method of claim 1, further comprising updating, by the computer, state information for the informal storage space to reflect modifications made to the informal storage space.

35. The method of claim 1, further comprising:
detecting, by the computer, a user's selection of an additional visual identifier on a web page; and determining, by the computer, whether the additional visual identifier corresponds to a particular item that can be added to the informal storage space.

36. The method of claim 1, further comprising:
determining, by the computer, that a web page includes items that can be added to the informal storage space; and
adding, by the computer, user interface elements to the web page, wherein user activation of a user interface element corresponding to a particular item causes the particular item to be added to the informal storage space.

* * * * *